(12) United States Patent
Takeda et al.

(10) Patent No.: US 6,714,932 B1
(45) Date of Patent: Mar. 30, 2004

(54) DISPLAY-EQUIPPED INFORMATION TERMINAL DEVICE HAVING MAILING FUNCTION AND ELECTRONIC MAIL TRANSMITTING METHOD

(75) Inventors: Kasumi Takeda, Toyko (JP); Ayumi Mizobuchi, Tokyo (JP); Mami Uchida, Saitama (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 09/657,703

(22) Filed: Sep. 8, 2000

(30) Foreign Application Priority Data

Sep. 9, 1999 (JP) ............................................. 11-255458

(51) Int. Cl.$^7$ .............................................. G06F 17/30
(52) U.S. Cl. ...................... 707/10; 707/104.1
(58) Field of Search .................. 707/2, 104.1, 10, 707/530, 3, 500; 709/206, 201–2; 345/556, 536, 717, 835; 705/8–9

(56) References Cited

U.S. PATENT DOCUMENTS 5,819,261 A * 10/1998 Takahashi et al. ............. 707/3
5,870,556 A * 2/1999 Cote et al. .................. 709/224
6,370,554 B1 * 4/2002 Sun-Woo ..................... 708/112

* cited by examiner

*Primary Examiner*—Diane D. Mizrahi
(74) *Attorney, Agent, or Firm*—Frommer Lawrence & Haug LLP; William S. Frommer; Gordon Kessler

(57) ABSTRACT

The present mechanism is equipped with a function of transmitting an electronic mail at a date designated by a user when the electronic mail is transmitted, and the designation of the transmission date can be intuitively and easily performed by using a calendar screen. According to the present mechanism, a mail transmission date can be easily set by merely selecting a mail transmission date setting screen from an electronic mail creating screen and designating a date column and a time column of a calendar having a scheduler function of the mail transmission date setting screen.

24 Claims, 6 Drawing Sheets

CALENDER SCREEN (TIME DESIGNATION)

MAIL (DESIGNATING SCREEN OF TRANSMISSION DATE)

MARCH OF 200X

| SUN | MON | TUE | WED | THU | FRI | SAT |
|-----|-----|-----|-----|-----|-----|-----|
| 1 | 2 | 3 | 4 | 5 | 6 | 7 |
| 8 | 9 | 10 | 11 | 12 ☆ | 13 | 14 |
| 15 | 16 | 17 | 18 | 19 | 20 | 21 |
| 22 ♪ | 23 | 24 | 25 | 26 | 27 | 28 |
| 29 | 30 | 31 | | | | |

← TO PREVIOUS MONTH | TO NEXT MONTH → | TIME DESIGNATION | TO MAIL CREATING SCREEN

FIG. 2

MAIL CREATING SCREEN

| MAIL (MAIL CREATING SCREEN) |
|---|
| TO: * * * * * |
| CC: * * * * * |
| TITLE: * * * * * |
| BODY: * * * * * * * * * * * * * * * * * *<br>* * * * * * * * * * *<br>* * * * *<br>* * * * * * * |
| STORE \| DELETE \| TRANSMIT JUST NOW \| TRANSMIT AT DESIGNATED DATE |

FIG. 3

CALENDER SCREEN

MAIL (DESIGNATING SCREEN OF TRANSMISSION DATE)

MARCH OF 200X

| SUN | MON | TUE | WED | THU | FRI | SAT |
|---|---|---|---|---|---|---|
| 1 | 2 | 3 | 4 | 5 | 6 | 7 |
| 8 | 9 | 10 | 11 | 12 ☆ | 13 | 14 |
| 15 | 16 | 17 | 18 | 19 | 20 | 21 |
| 22 ♪ | 23 | 24 | 25 | 26 | 27 | 28 |
| 29 | 30 | 31 | | | | |

TO PREVIOUS MONTH ← | TO NEXT MONTH → | TO MAIL CREATING SCREEN

MARK INDICATING TRANSMISSION FAILURE

MARK OF MAIL DISPLAYED ON CALENDAR
SCREEN FUSED WITH SCHEDULE FUNCTION

FIG. 9

CALENDER SCREEN (TIME DESIGNATION)

MAIL (DESIGNATING SCREEN OF TRANSMISSION DATE)

MARCH OF 200X

| SUN | MON | TUE | WED | THU | FRI | SAT |
|-----|-----|-----|-----|-----|-----|-----|
| 1 | 2 | 3 | 4 | 5 | 6 | 7 |
| 8 | 9 | 10 | 11 | 12 ☆ | 13 | 14 |
| 15 | 16 | 17 | 18 | 19 | 20 | 21 |
| 22 ♪ | 23 | 24 | 25 | 26 | 27 | 28 |
| 29 | 30 | 31 | | | | |

[TO PREVIOUS MONTH] [TO NEXT MONTH] [TIME DESIGNATION] [TO MAIL CREATING SCREEN]

FIG. 10A

ANALOG DISPLAY

MAIL (TRANSMISSION TIME DESIGNATION SCREEN)

A.M.　　　　　　　　P.M.

[TO PREVIOUS SCREEN] [TO MAIL CREATING SCREEN]

FIG. 10B

DIGITAL DISPLAY

13:09 ▲▼

DISPLAY-EQUIPPED INFORMATION TERMINAL DEVICE HAVING MAILING FUNCTION AND ELECTRONIC MAIL TRANSMITTING METHOD

BACKGROUND OF THE INVENTION

1. Field of the Invention

The present invention relates to an information terminal device for use in an electronic mail transmitting/receiving system comprising a server and information terminal devices which are connected to one another through a network, and more particularly to an information terminal device with a display which has a documentation function and an electronic mail function and also is equipped with a calendar having a scheduler function of automatically transmitting a mail on a date specified by a mail creator.

2. Description of the Related Art

Recent information terminals having an information transmission/reception function have been remarkably developed, and users thereof are not limited to a class of skilled persons who are skilled in operating personal computers or the like, but have extended to a class of so-called beginners. In addition, various functions have been recently required to be installed in an information terminal, and thus in order to master various functions, even skilled persons have been required to be skilled to some extent. Therefore, there have been developed various terminal devices which can be easily used by not only skilled persons skilled in operating information equipment such as personal computers, etc., but also persons who have been unskilled in these information equipments until now.

For example, even in terminal devices for transmitting/receiving an electronic mail has been developed a device which can transmit/receive a mail with a simple operation and also has various functions.

When an electronic mail is required to be immediately transmitted from a terminal device for transmitting/receiving an electronic mail, the electronic mail can be transmitted by a relatively simple operation. However, when a transmission date (the date and hour) for an electronic mail is required to be designated, a complicated operation which can be performed by only a middle or upper class of skilled persons which are skilled in handling electronic mails is needed. For example, a method of actuating a built-in timer of a personal computer or the like for a connection timing to a mail server or a mail transmission timing, or a method of starting another special soft, etc. are used to implement the designation of the transmission date. These methods are very difficult for beginners who are unskilled in operating personal computers or the like, and also even skilled operators need much time to use these methods. Further, a special operation is needed at a reception side.

Further, some of connection providers supply a mail transmission date designating service to users. However, a special service fee is separately charged to a user when the user uses this service.

SUMMARY OF THE INVENTION

According to the present invention, there is provided an information terminal device for use in an electronic mail transmission/reception system comprising a server and electronic mail terminal devices which are connected to each other through a network, characterized by comprising: display means for displaying a transmission date (date and hour) of an electronic mail with a calendar and a time table; designating means for designating the date with the calendar and the time table; storage means for storing the date thus designated; time counting means for counting the time until the designated date; and transmission means for transmitting the electronic mail to the server when the designated date comes, and also there is provided a transmission method which transmits an electronic mail by using the information terminal device.

According to the present invention, even a user who is unaccustomed to the operation of personal computers can designate an electronic mail transmission date intuitively and easily without handling a keyboard by using the calendar, the time table and a touch pen, and also can easily grasp a transmission schedule and a transmission result. Accordingly, a sequential mailing work from creation and transmission of an electronic mail until check of a transmission result can be performed by only an intuitive operation such as a touch-pen work. Therefore, even beginners can perform the sequential mailing work without relying on a manual, and skilled persons can perform the mailing work with a simple operation.

Further, the information terminal device of the present invention is interlocked with a scheduler function thereof. Therefore, in addition of the transmission/reception of mails, various schedules and events can be registered by displaying a calendar screen, and thus a user can check the transmission operation, transmission schedule and transmission results of mails while checking the schedules and events at the same time. Neither special setting nor special operation is needed at a reception side if the reception side is equipped with a mail software.

BRIEF DESCRIPTION OF THE DRAWINGS

FIG. 2 is a display on a mail creating screen of the present invention;

FIG. 3 is a display on a transmission date designating calendar screen for a created electronic mail in the present invention;

FIG. 9 is an example of a created electronic mail transmission date designating calendar screen;

FIG. 10A is an example of a created electronic mail transmission time designating screen and a display of a transmission time designating screen based on an analog clock, and FIG. 10B is an example of a created electronic mail transmission time designating screen and a display of a transmission time designating screen based on a digital clock.

DETAILED DESCRIPTION OF THE PREFERRED EMBODIMENTS

Preferred embodiments of an information terminal device according to the present invention will be described with reference to the accompanying drawings.

Figure 1A:
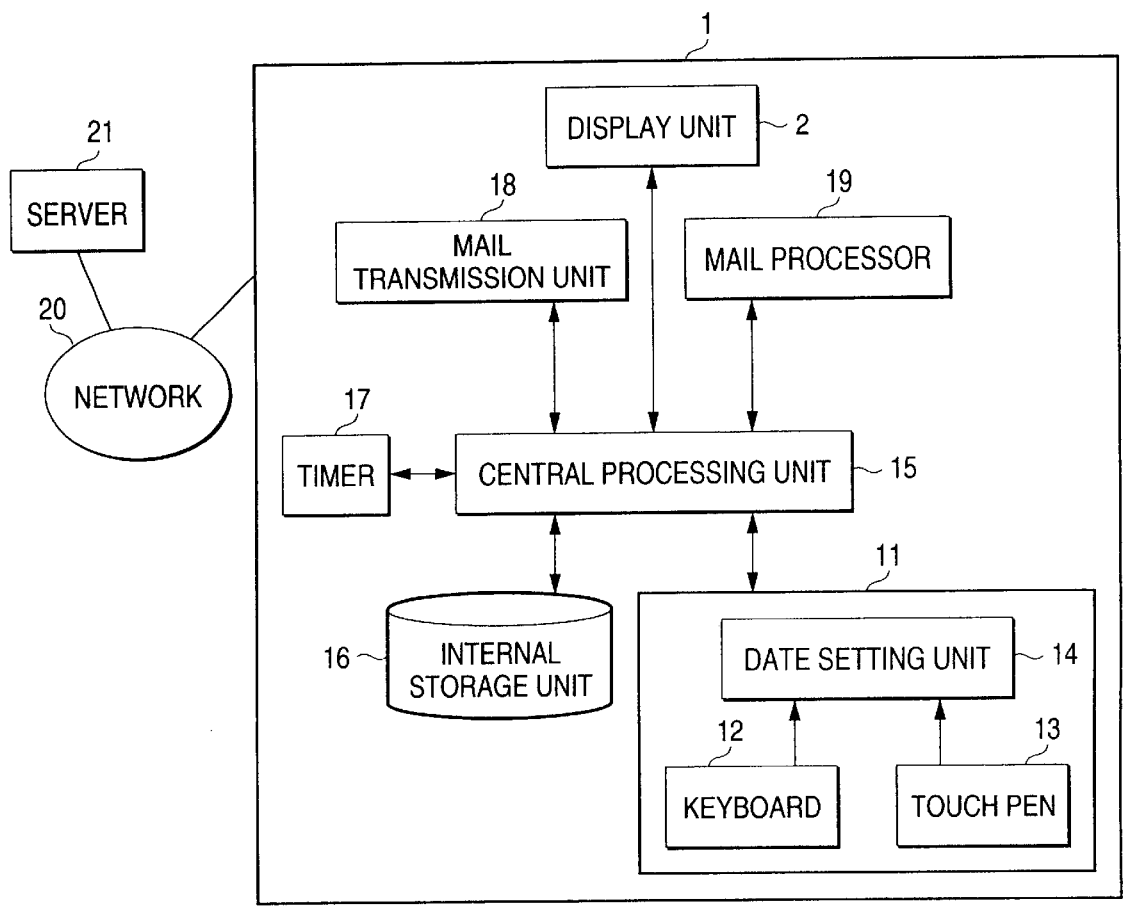
FIG. 1A is a diagram showing an electronic mail transmission/reception system according to the present invention.
Figure 1B:
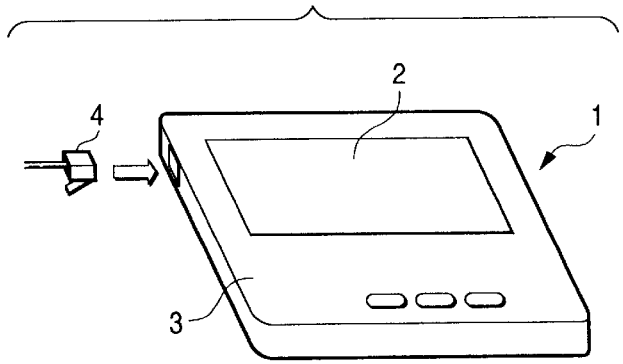
FIG. 1B is a diagram showing an information terminal device for use in the electronic mail transmission/reception system according to the present invention.

FIG. 1A is a diagram showing the system construction of a first embodiment of an information terminal device according to the present invention, and FIG. 1B is an outlook of the information terminal device which has a mail function and is equipped with a liquid crystal display unit (touch panel). The following description will be made particularly on the construction of parts which are associated with a mail transmission date designating function, and the description and illustration of the construction of the other parts are omitted because they have the same function and construction as a general information terminal device.

As shown in FIG. 1B, the information terminal device of the present invention comprises a liquid crystal display unit 2 having a touch panel function, a mail function/calendar function processing controller 3 comprising a keyboard 12 or the like, and a telephone line jack 4. The mail function/calendar function processing controller 3 comprises the keyboard 12 and a touch pen 13. As shown in FIG. 1A, the electronic mail transmission/reception system comprises a server 21, and an information terminal device(s) 1 which is connected to a network 20 through a telephone line. The information terminal device 1 includes a controller 11 comprising a keyboard 12, a touch pen 13 and a date setting unit 14 controlled on the basis of input signals from the keyboard 12 and the touch pen 13, a liquid crystal display unit 2 having a touch panel function, a central processing unit 15, an internal storage unit 16, a timer 17, a mail transmission unit 18, a mail processor 19, etc.

The keyboard 12 is an input device for inputting data such as commands, character sequences, etc., and it is used to create an electronic mail or a choice is selected on the screen of the display unit 2 in combination with the touch pen 13. The touch pen 13 is particularly used to operate the date setting unit 14 when a transmission date of an electronic mail is set. Various data or instructions input from the keyboard 12 or the touch pen 13 are input to the central processing unit 15 through the date setting unit 14. The information terminal device has not only the mail function, but also a calendar having a scheduler function. By using these input means, various schedules or events can be input into the information terminal device, and then checked while operating the mail function.

The central processing unit 15 controls the internal storage unit 16 in which a created electronic mail, transmission date designating data, etc. are stored and preserved, the mail processor 19 for processing the electronic mail created by using the keyboard 12, etc., the mail transmission unit 18 for transmitting the electronic mail created, etc.

Figure 8:
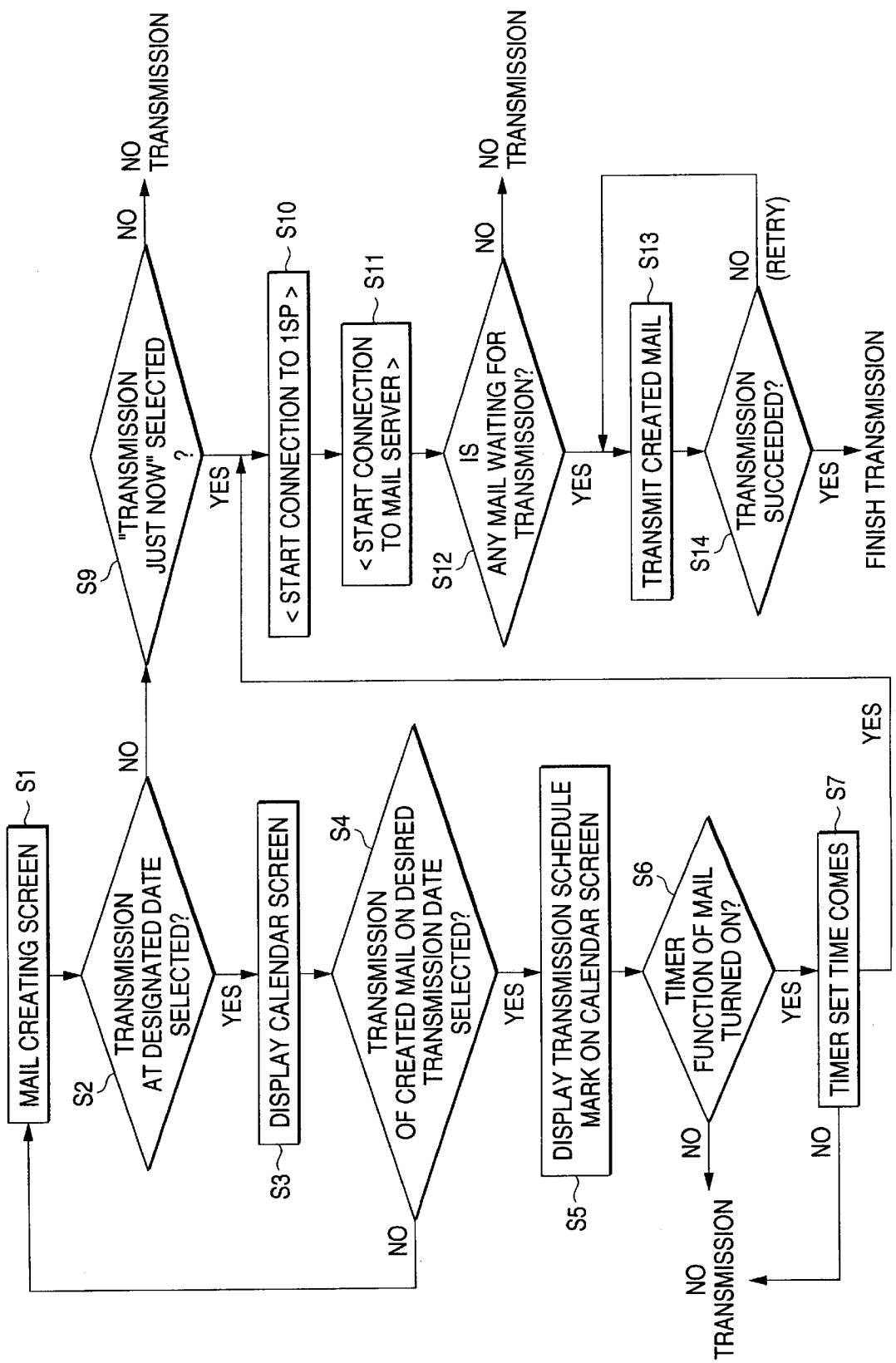
FIG. 8 is a flowchart showing the flow of the transmission date designating processing of the created electronic mail in the present invention.

FIG. 8 is a flowchart showing of the flow of the electronic mail transmission date setting processing, and the processing of setting the transmission date of the created electronic mail will be described with reference to FIG. 8 and FIGS. 2 to 7.

A menu screen (not shown) is displayed on the display unit 2 of the information terminal device 1, and if an item for creating an electronic mail in the menu is selected with the touch pen 13, an electronic mail creating screen is displayed (FIG. 2). When this screen is displayed, English (or other languages) input mode is automatically turned on. On the electronic mail creating screen, "Mail (Mail creating screen)" is displayed at the uppermost stage, and icons of "store", "delete", "transmit just now", "transmit at designated date" are displayed at the lowermost stage. At the center of the screen, input display frames for "To:" (input a destination), "Cc:" (type of mail), "Title:" (title of mail) and "the body:" are displayed from first to fourth columns, respectively. If characters are overflowing from each input frame, these characters are automatically scrolled. Therefore, a long mail can be created (step S1).

When an electronic mail is created, any one of the icons at the lowermost stage is selected. If the [Store] icon is selected with the touch pen 13, a file name input frame (not shown) is displayed, and then when the name of a file to be stored is input, the storage processing is executed. If the [delete] icon is selected with the touch pen 13, the electronic mail being created is deleted, and the display frame is returned to the menu screen (not shown). If the [transmit just now] icon is selected with the touch panel 13, the electronic mail created is immediately transmitted to the destination indicated in "To:". At this time, if the information terminal device is not connected to the server, it is automatically or manually connected to a preset mail server to perform mail transmission processing (steps S9 to S14).

When the electronic mail thus created is transmitted other day, the "transmit on designated date" is selected with the touch pen 13 (step 2). At this time, the calendar screen is displayed (FIG. 3) (step 3). On this calendar screen, "Mail (designating screen of transmission day)" is displayed at the uppermost stage, and icons of "←to previous month", "to next months→" and "to mail creating screen" are displayed at the lowermost stage. At the center of the screen is displayed a calendar having a scheduler function of the information terminal device. Since this calendar has the scheduler function, various icons are displayed on the date columns of the calendar to represent various schedules, etc. For example, assuming that today is March 6 (Friday) in 200X, the date column of the sixth of March is lightly crosshatched to indicate that the sixth day is today. "☆" on the date column of the twelfth of March represents that a conference is held on the twelfth of March, and "♪" on the date column of the twenty second of March represents that a music concert is held on the twenty second of March.

Figure 4:
FIG. 4 is a display of a transmission schedule mark on the calendar of the present invention.

When the created electronic mail is transmitted on March 9 (Tuesday) of 200X, the date column of the ninth of March is selected with the touch pen 13 (step S4) and the transmission schedule mark as shown in FIG. 4 is displayed (step S5), thereby indicating that the information terminal device is set so that the electronic mail thus created will be transmitted on March 9 (Tuesday) of 200X.

Since the transmission time is not designated in the first embodiment, the information terminal device is automatically connected to a designated mail server at a predetermined time once per day with the timer function. For example, assuming that the time is set to twelve o'clock midnight, this electronic mail will be automatically connected and transmitted to the designated mail server at the twelve o'clock midnight on March 9 of 200X. When the transmission date is selected, the display of the transmission schedule mark is checked and then the "To mail creating screen" is selected with the touch pen 13, the display frame is returned to "Mail creating screen" of FIG. 2. If no electronic mail is newly created, the "store" icon is selected with the touch pen 13 to perform the mail storage processing, and then the display frame is returned to the menu frame, or the "delete" icon is selected with the touch pen 13 and then the display frame is returned to the menu frame without executing the storage processing on the electronic mail.

Figures 6, 7:
FIG. 6 is a display of a transmission failure mark on the calendar of the present invention.
FIG. 7 is a display of a calendar which is fused with a scheduler function of the present invention.

When a transmission schedule mark is displayed on the calendar screen of the step S5, the timer function of mails is turned on (step S6). If the date and hour thus set (in this embodiment, twelve o'clock midnight on March 9 of 200X) come, the information terminal device is automatically connected to the mail server (step S7), and the connection to the mail server and the mail transmission processing of the steps S10 to S14 are automatically executed. When the mail transmission succeeds (step S14), the transmission schedule mark indicated on the date column of March 9 on the calendar having the scheduler function is changed to a mark (inverted transmission scheduler mark) indicating the transmission completion (transmission completion mark). If the calendar is displayed on the information terminal device, the transmission result can be checked with being fused with other schedules as shown in FIG. 7. In the display of FIG. 7, an icon indicating the date on which an electronic mail is received and a mark indicating the response due date to the received mail are displayed.

When the mail transmission fails due to some trouble in step S14, the mail transmission is retried at a predetermined frequency. In the case where the mail transmission fails, the transmission schedule mark is displayed while a mark of "X" is superposed on it as shown in FIG. 6. Accordingly, the failure of the mail transmission can be surely grasped. The information terminal device may be designed so that if the mail transmission fails, the cause thereof is displayed.

FIGS. 9 and 10 show a second embodiment of the information terminal device of the present invention. In the second embodiment, not only the transmission date of an electronic mail, but also the transmission time of the electronic mail can be designated. When the "transmission on designated date" icon is selected on the mail creating screen of FIG. 2 with the touch pen 13, a calendar screen of FIG. 9 is displayed. In this case, an icon of "time designation" is added on the screen of FIG. 3. Here, if the display frame is returned to the mail creating screen without designating the time after a transmission date is designated, this electronic mail is transmitted at the twelve 0'clock midnight of the designated date as in the case of the first embodiment.

However, if the "time designation" icon is selected with the touch pen 13, the display frame is changed to "Designation screen of transmission time" of FIG. 10A or 10B.

FIG. 10A shows an embodiment of the designation screen of transmission time when the time is designated on the basis of an analog clock. In this case, each scale mark of the round dials of A.M. and P.M. clocks is selected with the touch pen 13 to designate a desired time. In this embodiment, the time designation can be performed at a time interval of 12 minutes (each of four scale marks between scale marks indicating "hour"). If the number of scale marks indicating "minute" is set to three, the time designation can be performed at a time interval of 15 minutes. If the time designation is carried out, the timer function is turned on so that an electronic mail will be transmitted at the designated time of the designated date as in the case of the first embodiment. If the designation is finished, a "previous screen" icon or a "mail creating screen" icon is selected with the touch pen 13 and the setting is finished.

FIG. 10B shows another embodiment of the designation screen of transmission time when the time is designated on the basis of a digital clock. In this embodiment, a desired time is designated by selecting the numerical value indicating the time with the touch pen 13 to invert the time display, selecting Δ, ∇ marks with the touch pen 13 to vary the time display, selecting the numerical value indicating the minute with the touch pen 13 to invert the minute display, and selecting Δ, ∇ marks with the touch pen 13 to vary the minute display, thereby setting the desired time.

Figure 5:
FIG. 5 is a display of a transmission completion mark on the calendar of the present invention.

Various modifications may be made to the above-described embodiments. For example, when the electronic mail is normally transmitted and when the electronic mail is not normally transmitted, these transmission results may be displayed on the calendar as shown in FIGS. 5 and 6, or information on these transmission results may be dialogically displayed.

Further, the calendar display frame for designating the transmission date is not necessarily limited to a calendar based on each month as shown in FIG. 3. For example, it may be a calendar based on several months or the like, and other frame layouts may be used.

The calendar having the scheduler function is described as a part of the mail function in the embodiments of the present invention. However, it may be an application which is installed independently of the information terminal device having the mail function. In this case, the information terminal device is set so that the application of the calendar can be linked when the mail transmission date is designated (see steps S2, S3 of the flowchart of FIG. 8).

In the above-described embodiments, the transmission schedule and the transmission result are represented with icons. However, the present invention is not limited to the icons, and any other expression marks such as characters, figures, symbols or the like may be used insofar as these clearly indicate the transmission schedule and the transmission result.

According to the information terminal device of the present invention thus constructed, even a user who is unaccustomed to the operation of personal computers can intuitively and easily designate an electronic mail transmission date without handling any keyboard by using the calendar and the time table and also using the touch pen. Further, the user can easily grasp a transmission schedule and a transmission result. Therefore, the user can perform the sequential mailing operation from the creation, transmission of the electronic mail to the check of the transmission result by carrying out only an intuitive operation such as a so-called touch pen work. Accordingly, even beginners can operate the information terminal device without relaying on a manual, and even skilled persons can perform the mailing work with a simple operation.

Further, the information terminal device is interlocked with the scheduler function thereof. Therefore, in addition to the transmission/reception of mails, various schedules and events can be registered by displaying the calendar screen, and the user can check the transmission operation and transmission schedule of a mail and the transmission result while watching the schedules and the events at the same time. In addition, if a mail soft is provided to the reception side, neither special setting nor special operation would be needed to the reception side.

What is claimed is:

1. A display-equipped information terminal device having a mail function for use in an electronic mail transmission/reception system comprising a server and information terminal devices which are connected through a network, comprising:

display means for displaying a plurality of dates in a calendar format from which a future transmission date of an electronic mail may be selected;

designating means for designating a future transmission date by using the calendar;

storage means for storing the future transmission date thus designated;

time counting means for counting the time until the future date thus designated arrives; and transmission means for transmitting the electronic mail to the server when the future designated transmission date arrives.

2. The display-equipped information terminal device as claimed in claim 1, wherein the calendar displayed on said display means is a calendar having a scheduler function.

3. The display-equipped information terminal device as claimed in claim 1, wherein a transmission schedule and a transmission result are displayed on the calendar with any one of a character, a figure and a symbol.

4. The display-equipped information terminal device as claimed in claim 3, wherein the display of the transmission result is carried out by displaying success or failure of the transmission on the calendar with any one of the character, the figure and the symbol.

5. The display-equipped information terminal device as claimed in claim 4, wherein if the transmission fails, both of the transmission result and the cause thereof are displayed on the calendar.

6. The display-equipped information terminal device as claimed in claim 1, wherein a touch pen is used as the designating means for designating the transmission date.

7. A display-equipped information terminal device having a mail function for use in an electronic mail transmission/reception system comprising a server and information terminal devices which are connected through a network, comprising:

display means for displaying a plurality of dates in a calendar format from which a future electronic mail transmission date may be selected;

designating means for designating the electronic mail future transmission date with the calendar and a time table;

storage means for storing the electronic mail future transmission date thus designated;

time counting means for counting the time until the designated electronic mail future transmission date arrives; and transmission means for transmitting the electronic mail to the server when the designated electronic mail future transmission date arrives.

8. The display-equipped information terminal device as claimed in claim 7, wherein the calendar displayed on said display means is a calendar having a scheduler function.

9. The display-equipped information terminal device as claimed in claim 7, wherein a transmission schedule and a transmission result are displayed on the calendar and the time table with any one of a character, a figure and a symbol.

10. The display-equipped information terminal device as claimed in claim 9, wherein the display of the transmission result is carried out by displaying success or failure of the transmission on the calendar and the time table with any one of the character, the figure and the symbol.

11. The display-equipped information terminal device as claimed in claim 10, wherein if the transmission fails, both of the transmission result and the cause thereof are displayed on the calendar.

12. The display-equipped information terminal device as claimed in claim 7, wherein a touch pen is used as the designating means for designating the transmission date.

13. A method of transmitting an electronic mail from an information terminal device for use in an electronic mail transmission/reception system comprising a server and information terminal devices which are connected through a network, comprising the steps of:

designating an electronic mail future transmission date by using a calendar;

storing the future transmission date thus designated;

counting the time until the designated future transmission date arrives; and transmitting the electronic mail to the server when the designated future transmission date arrives.

14. The electronic mail transmission method as claimed in claim 13, wherein the calendar is a calendar having a scheduler function.

15. The electronic mail transmission method as claimed in claim 13, wherein a transmission schedule and a transmission result are displayed on the calendar with any one of a character, a figure and a symbol.

16. The electronic mail transmission method as claimed in claim 15, wherein the display of the transmission result is carried out by displaying success or failure of the transmission on the calendar with any one of the character, the figure and the symbol.

17. The electronic mail transmission method as claimed in claim 16, wherein if the transmission fails, both of the transmission result and the cause thereof are displayed on the calendar.

18. The electronic mail transmission method as claimed in claim 13, wherein a touch pen is used as the designating means for designating the transmission date.

19. A method of transmitting an electronic mail from an information terminal device for use in an electronic mail transmission/reception system comprising a server and information terminal devices which are connected through a network, comprising the steps of:

designating an electronic mail future transmission date by using a calendar and a time table;

storing the future transmission date thus designated;

counting the time until the designated future transmission date arrives; and transmitting the electronic mail to the server when the future designated transmission date arrives.

20. The electronic mail transmission method as claimed in claim 19, wherein the calendar is a calendar having a scheduler function.

21. The electronic mail transmission method as claimed in claim 19, wherein a transmission schedule and a transmission result are displayed on the calendar and the time table with any one of a character, a figure and a symbol.

22. The electronic mail transmission method as claimed in claim 21, wherein the display of the transmission result is carried out by displaying success or failure of the transmission on the calendar and the time table with any one of the character, the figure and the symbol.

23. The electronic mail transmission method as claimed in claim 22, wherein if the transmission fails, both of the transmission result and the cause thereof are displayed on the calendar and the time table.

24. The electronic mail transmission method as claimed in claim 19, wherein a touch pen is used as the designating means for designating the transmission date.

* * * * *